B. N. DAVIS.
ENDLESS CARRIER FOR CONVEYERS.
APPLICATION FILED NOV. 10, 1914.
1,155,340. Patented Oct. 5, 1915.
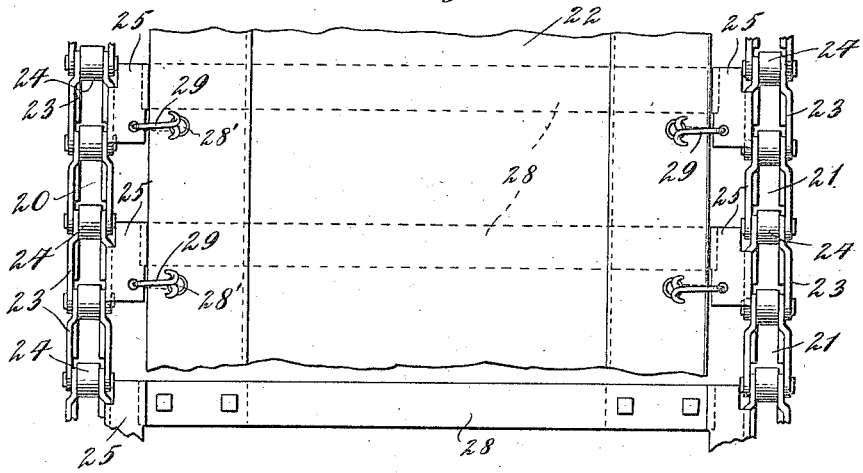
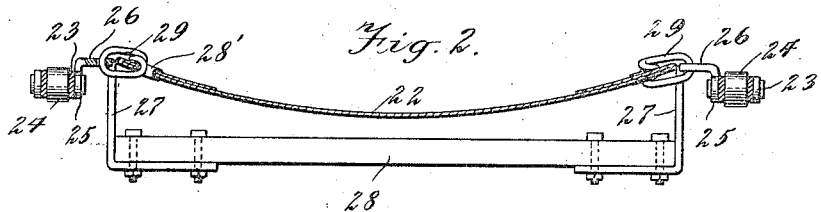
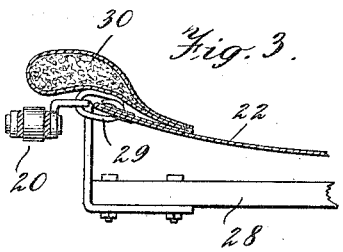
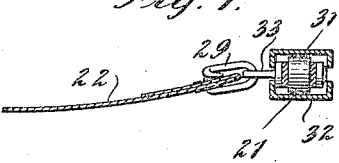

UNITED STATES PATENT OFFICE.

BEMISS N. DAVIS, OF NEW ORLEANS, LOUISIANA.

ENDLESS CARRIER FOR CONVEYERS.

1,155,340.  Specification of Letters Patent.  Patented Oct. 5, 1915.

Application filed November 10, 1914. Serial No. 871,235.

*To all whom it may concern:*

Be it known that I, BEMISS N. DAVIS, a citizen of the United States, residing at the city of New Orleans, in the parish of Orleans and State of Louisiana, have invented certain new and useful Improvements in Endless Carriers for Conveyers, of which the following is a full, clear, and exact description.

This invention relates to endless carriers for conveyers adapted to be used in loading and unloading ships, cars and the like, and has for its primary object the provision of a carrier by which bunches of bananas and like objects which are easily bruised and injured may be expeditiously handled without any liability of damage while in transit, which damage results, in most instances, from the objects carried by the apron striking or rubbing against hard rigid members which extend transversely across the apron and upon which the apron rests. In one common construction of a carrier, these rigid members are the cross bars which maintain the endless chains or driving members in spaced parallel relation to each other; in another form, they consist of the rollers upon which the apron travels, while in other constructions they may be of a still different character.

My invention aims to eliminate any and all of such members against which the object may strike while on the apron, and consists accordingly of a carrier in which the flexible apron is supported solely by spaced endless chains or members to which it is secured along its side edges, the apron being of sufficient width to sag transversely under load to form a substantially longitudinal trough in the apron, the sides of which will prevent the objects from leaving the apron while the carrier is in motion, the parallel chains being held in spaced relation to each other by members which are so disposed that there is no liability of the objects carried by the carrier striking or rubbing against the same.

The invention also consists of the constructions and combinations which will be hereinafter described and specifically pointed out in the appended claims.

In the accompanying drawings:

Figure 1 is a front elevation of a portion of the endless carrier, constructed in accordance with the principles of my invention; Fig. 2 is a side elevation of Fig. 1; Fig. 3 is a detail of a modified form of flexible apron; and Fig. 4 is a detail of a modified construction by which the parallel endless members may be maintained in spaced relation to each other.

In the accompanying drawings only a portion of the carrier is shown, which comprises broadly parallel chains 20 and 21 forming the supporting members for a flexible apron 22, upon which the articles to be transported are adapted to rest. It is to be understood, however, that the complete carrier constitutes an endless belt which is supported by any suitable structure carrying driving sprocket wheels or like parts, over which the endless chains travel. This supporting structure is so arranged that the surface of the apron which supports the articles to be carried, lies in a horizontal plane or is slightly inclined therefrom, so that the objects carried by the apron will not slip or slide down the same under the influence of gravity. Each of these parallel chains consists of a plurality of flat links 23 which are secured together by rivets upon which are placed the usual type of rollers 24 adapted to engage the teeth of the sprocket wheels (not shown). In one construction of the carrier, instead of the usual flat links 23, special links 25 are provided at closely spaced intervals in the inner sides of each of the chains. These links comprise flat horizontally disposed portions 26 which project inwardly from each of the chains toward each other, from which portions there depends a piece 27 having its free end also bent to form a seat for one end of a cross bar 28 of wood or other material which is bolted thereto, which cross bars maintain the chains in spaced parallel relation to each other. The apron 22 is of canvas or like flexible material and preferably has its side edges folded over to form a reinforced strip in which are provided a plurality of eyes 28'. The apron is attached to the chains 21 by open links 29 which pass through an aperture in the plate 26, which links have one of their hooked ends passing through the eyelets in the apron, while the other hooked portions clamp against the apron to prevent their inadvertent displacement of the links.

The apron is of sufficient width so that when the bunches of bananas or other objects are placed thereon, their weight will cause it to sag transversely to form a substantially continuous trough running longitudinally of the carrier, the side walls of which will prevent the articles from rolling off the carrier while it is in motion. The rigid cross bars 28 hold the chains in spaced relation at all times, and since they are dropped below or are offset from the plane of the apron, it is clear that there are no hard or rigid members against which the articles can strike while on the apron, whereby there is little, if any, danger of the articles being injured while in transit. The formation of the continuous trough has also the advantage that the articles may be placed lengthwise thereon very close together and for this reason the speed and rapidity with which the articles may be transported is greatly facilitated.

In order to protect the articles to be carried from coming in contact with the links 29 which secure the apron to the chains 20 and 21 or in contact with the chain itself, the construction shown in Fig. 3 may be used, which comprises a protecting pad 30 extending longitudinally of the apron at each side thereof, which is placed over the links 29 and a portion of the chains 21. The pads also serve to accentuate the curvature of the trough and will thereby insure that there will be little, if any, liability of the articles rolling off the apron. This construction is particularly adaptable for carriers where, owing to the lack of space, the width of the apron is restricted.

Referring to Fig. 5, a modified construction is shown, which may be used in lieu of the cross-bars 28, for maintaining the parallel chains in spaced relation to each other and consists of channel bars 31 and 32 arranged above and below the links of the chain and between which the chains are confined. The links 29 which hold the apron may, in this construction, be secured by means of eyes 33 to the links 23. The parallel chains may also be maintained in spaced parallel relation by other constructions, which will be obvious to one skilled in the art.

I have shown the endless carrier associated with no particular form of conveyer, as it is not my intention to so limit the invention, and I deem the construction of an endless carrier having a flexible apron, which is supported only along its side edges and its intermediate portions entirely free of any supporting structure so that it may sag transversely when subjected to the weight of the articles to be carried and thereby form a trough which extends longitudinally of the carrier, to be novel with me, and it is therefore my intention to be limited only by the scope of the claims appended hereto.

What I claim is:

1. A carrier of the class described, comprising a pair of endless spaced parallel driving members, an endless flexible apron secured along its edges to said members, the intermediate portion of said apron being unsupported throughout its entire length and sagging transversely when subjected to the weight of the objects carried thereby to form a longitudinal trough in which said objects rest, and means secured to and connecting said members for supporting them in spaced relation to each other, said means being disposed out of engagement with said apron throughout the entire length of the same.

2. A carrier of the class described, comprising a pair of spaced endless members, a flexible apron secured along its side edges to said members, the intermediate portion of said apron being unsupported for its entire length and sagging transversely when subjected to the weight of the objects carried thereby to form a longitudinal trough, and means for maintaining said members in spaced relation to each other comprising cross-bars secured at their ends to said members and offset from the plane thereof to permit the apron to sag without coming in contact therewith.

3. A carrier of the class described, comprising a pair of spaced endless driving members, a flexible apron secured along its side edges to said members, and cross-bars secured to said members for maintaining them in spaced relation, said cross-bars being offset from the plane of said members and disposed out of contact with said apron.

4. A carrier of the class described, comprising a pair of spaced parallel endless driving members, a flexible apron secured to said members along its side edges, means for supporting said members in spaced relation to each other, disposed out of engagement with said apron, and pads secured to one face of the apron adjacent its side edges and projecting over said members.

5. A carrier of the class described, comprising a pair of spaced parallel endless chains, a flexible apron secured to said chains along its side edges, means for supporting said chains in spaced relation to each other disposed out of engagement with said apron, and pads secured to the face of the apron adjacent its side edges and projecting over said members for protecting the objects adapted to be carried in said apron from contact with said chains.

In witness whereof, I subscribe my signature, in the presence of two witnesses.

BEMISS N. DAVIS.

Witnesses:
J. A. BARRE
F. EISLER.